United States Patent [19]
Anderson

[11] Patent Number: 4,750,855
[45] Date of Patent: Jun. 14, 1988

[54] RETROFITTABLE VEHICLE FRAMEWORK MEANS AND METHOD FOR INTERCHANGEABLE USE WITH A VARIETY OF ATTACHMENT UNITS

[76] Inventor: Leonard E. Anderson, 508 S. Elm, Toledo, Iowa 52342

[21] Appl. No.: 920,369

[22] Filed: Oct. 20, 1986

[51] Int. Cl.$^4$ .............................................. B60P 1/64
[52] U.S. Cl. ...................................... 414/498; 296/184
[58] Field of Search ............... 414/498; 296/167, 168, 296/184; 254/418, 421; 269/69

[56] References Cited

U.S. PATENT DOCUMENTS

| | | | |
|---|---|---|---|
| 1,352,625 | 9/1920 | Pospeshil | 280/785 |
| 1,565,624 | 12/1925 | Chilton | 280/785 |
| 1,653,020 | 12/1927 | Oechsle | 280/799 |
| 2,002,851 | 5/1935 | Divney | 280/106 |
| 2,818,272 | 12/1957 | De Lay | 280/106 |
| 3,096,894 | 7/1963 | Proler et al. | 298/22 P |
| 3,255,906 | 6/1966 | Proler et al. | 414/498 X |
| 3,362,552 | 1/1968 | Thiele | 414/498 X |
| 3,504,814 | 4/1970 | McCleary | 414/498 |
| 3,520,433 | 7/1970 | Blackburn | 414/498 |
| 3,734,223 | 5/1973 | Anderson | 180/294 |
| 3,757,976 | 9/1973 | van der Lely | 414/498 |
| 4,040,640 | 8/1977 | Begg | 280/106 |
| 4,474,526 | 10/1984 | Gevers | 414/498 X |
| 4,522,550 | 6/1985 | Whitehouse | 414/498 |

Primary Examiner—Robert J. Spar
Assistant Examiner—David A. Bucci
Attorney, Agent, or Firm—Zarley, McKee, Thomte, Voorhees & Sease

[57] ABSTRACT

A retrofittable vehicle framework and method for interchangeable use of a variety of attachment units on the vehicle framework. The framework includes a first overlay rigidly retrofittable to an existing framework of a vehicle. The attachment units have second overlays secured to them which are correspondingly positioned to allow matable positioning over the first overlays on the vehicle framework. The vehicle framework carries coupling members which are operable to releasably secure the second overlays to the first overlays and vehicle framework thus securing the selected attachment unit to the vehicle framework. The vehicle can be either motorized and self-locomoting, or a trailer. Members can also be included on the vehicle framework to lift the attachment unit from the framework when changing units, and then be released from the unit.

24 Claims, 5 Drawing Sheets

RETROFITTABLE VEHICLE FRAMEWORK MEANS AND METHOD FOR INTERCHANGEABLE USE WITH A VARIETY OF ATTACHMENT UNITS

BACKGROUND OF THE INVENTION

1. Field of the Invention

This invention relates to a means and method for interchangeable use of a variety of attachment units to a vehicle, and in particular, a retrofittable vehicle framework means for accomplishing the same.

2. Problems In The Art

It would be economical and advantageous to be able to utilize a vehicle with different, interchangeable attachment units. "Vehicle" is defined herein to mean either self-locomoting or non-self-locomoting; for example, either trucks or trailers. "Attachment unit" means any type of bed, box, or other structure which is applied to the framework of the truck or trailer or other vehicle.

A vehicle such as a pickup truck could be alternatively utilized with a pickup bed, a flat bed, an enclosed box, a dump bed, or a camper unit. Many other different attachment units are possible. Currently, however, much time and effort is required to detach the rigidly secured pickup box from the truck and, in turn, rigidly attach the other desired attachment unit. In fact, most variations of use for a pickup truck are accomplished by adding on to the existing pickup box, and not removing it to interchange a different attachment unit.

The same advantageous considerations apply to larger trucks and to trailers. To be able to efficiently transform an existing conventional truck or trailer framework to utilize a variety of different attachments would make better use of the truck or trailer and eliminate the requirement for a variety of different trucks or trailers.

Additionally, it would be advantageous to have structure on the vehicle framework which would assist in the actual interchanging of the attachment units. It would also be advantageous to carry structure on the vehicle framework to allow dumping or tipping operations for those type of attachment units.

Although such a system needs to be efficient and quick, it must also insure that the attachment units are secured to the vehicle framework when in use and that the strength of the vehicle framework and the attachment units is not compromised.

A further problem exists in that many vehicle frames are comprised of parallel, spaced-apart longitudinal frame rails which are not even along their lengths. For example, most pickup frame rails have a bend over the pickup rear axle. Because the attachment units generally require a flat bottom surface, a problem exists in providing a system which can mate the flat bottom attachment units with the varying-in-shape framework of the vehicle.

The advantageous nature of such an invention can be shown through additional illustrations. In order to diminish delays in shipping many items, the vehicles could be driven or pulled to the destination, and then the attachment unit holding the payload could be removed and unloaded at the convenience of the persons at the destination. The vehicle could then either take on a new attachment unit or move on, without having to wait for the unloading process.

Rental truck and trailers could be advantageously multi-useable by having quick adaptability to different attachment units.

Construction companies many times require a variety of different vehicles to perform different functions. By having different attachment units available, these companies would not have to expend the tremendous amounts of money to buy different trucks and trailers for each use, which also many times leaves those vehicles idle.

Farm trucks and trailers also many times sit idle for long periods of time. By having interchangeable attachment units, they could be more economically utilized.

The invention is also particularly advantageously adaptable to use by municipal, county, state, and federal governmental agencies, which all require many types of vehicles for many different functions. An example would be road maintenance and construction.

It is therefore a primary object of the present invention to provide a retrofitable vehicle framework means and method for interchangeable use with a variety of attachment units which improves upon or solves the problems and disadvantages in the art.

A further object of the present invention is to provide an efficient and quick system for utilizing different attachment units to a vehicle framework.

Another object of the present invention is to provide an integrated system for attaching and detaching the attachment units, and using the attachment units.

Another object of the present invention is to provide a system which is economical, durable, safe, and reliable.

These and other objects, features, and advantages of the present invention will become more apparent with reference to the accompanying specification and claims.

SUMMARY OF THE INVENTION

The present invention is a means and method for allowing a vehicle framework to be used with a variety of attachment units. The invention is retrofittable to existing vehicle frameworks. Vehicle frameworks are intended to cover both motorized, self-locomoting vehicles such as trucks, and non-motorized, non-self-locomoting vehicles such as trailers.

A first overlay means is secured to the existing vehicle framework along its length. A second overlay means is rigidly secured to the attachment unit and is positioned on the attachment unit to matingly correspond with the first overlay means when the attachment unit is positioned on the vehicle framework. Coupling means associated with the vehicle framework are selectively operable to secure the second overlay means to the first overlay means to secure the attachment unit to the framework. When the coupling means are released, the attachment unit can be removed from the framework, and a different attachment unit can be substituted.

The framework can also carry means to lift or tilt the attachment unit, either during use, or to facilitate removal and installation of the attachment unit to the framework. The coupling means must be released to allow such raising or tilting.

The attachment units themselves may include retractable or foldable legs which, together with the means for raising and lowering the attachment units, allows the present invention to provide an integrated and comprehensive system for interchanging attachment units.

DETAILED DESCRIPTION OF THE PREFERRED EMBODIMENT

The invention can be defined in more detail with reference to the drawings. By referring to FIGS. 1-3, it can be seen that the invention facilitates one vehicle 10 to utilize numerous attachment units 12. The invention allows easy, quick, and economical attachment, removal, or interchange of attachment units 12, so that vehicle 10 can be used for multiple purposes.

Figures 1, 2A, 2B, 2C, 3, 4:
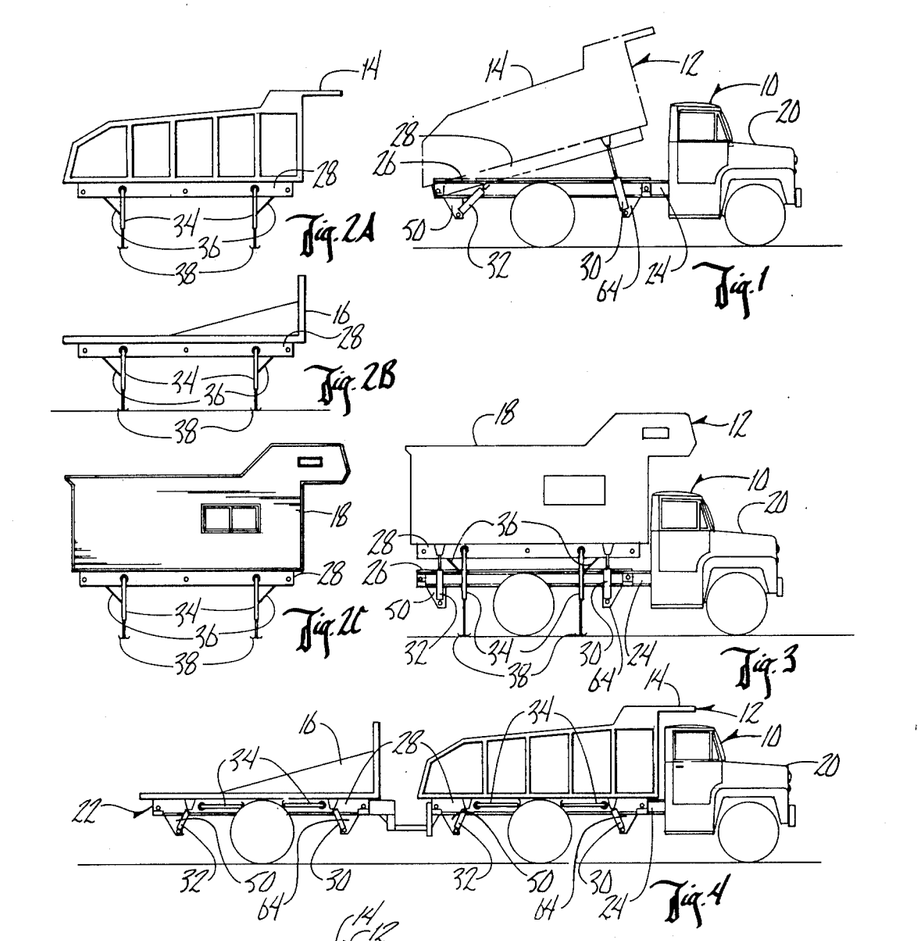
FIG. 1 is an elevational view of one embodiment of the present invention depicting operation of the attachment unit for the embodiment as a dumping bed for a truck.
FIGS. 2(a)–(c) are examples of alternative attachment units which can be utilized with the truck of FIG. 1, and additionally showing operation of the stand-alone support legs for the units when removed from the truck.
FIG. 3 is an elevational view of the truck of FIG. 1 showing the attachment unit raised from the truck.
FIG. 4 is an elevational view of the present invention showing the dumping bed of FIG. 1 in a secured position to the truck frame, and showing an embodiment of the invention as applied to a trailer.

It is to be understood that the reference numeral 12 refers generally to the attachment units, but for purposes of example only, FIGS. 2(a)–(c) depict specific types of attachment units 12; namely dump box 14, flatbed 16, and camper unit 18. These examples are not inclusive, but are for illustration only. Other types of attachment units with different functions can be utilized with the present invention, as is known in the art.

It is also to be understood that vehicle 10 is generally referred to by reference numeral 10, but can include both self-locomoting trucks 20, or non-self-locomoting trailers 22 (see for example FIG. 4).

By again referring to FIGS. 1-3, the general operation of the present invention will now be described. Each vehicle 10 has an original frame 24 (see also FIGS. 7 and 8) which has a first overlay means 26 rigidly secured over it. Each attachment unit 12, in turn, has a second overlay means 28 rigidly secured to its bottom. The second overlay means 28 is mateably and removeably positionable upon the first overlay means 26. Thus, each attachment unit 12 can be interchangeably positioned upon the vehicle 10 according to choice. Coupling means, described hereinafter, are positioned on the vehicle 10, and are selectively operated to secure attachment unit 12 to vehicle 10 for use. When it is desired to remove attachment unit 12, the coupling means are released and vehicle 10 is separated from the attachment unit.

Additionally, the invention includes the means and method to assist in the interchangeability, attachment, and removal of attachment units 12 to vehicle 10. To accomplish this vehicle 10 further carries lifting means which are pivotably attachable between vehicle 10 and attachment unit 12. As shown in FIGS. 1 and 3, the preferred lifting means are hydraulic cylinders 30 and 32. Cylinders 30 and 32 can be selectively operated to lift the attachment unit 12 away from frame 24 of vehicle 10 to prepare for removal of attachment unit 12, or can operate to lower attachment unit 12 down upon frame 24 when attaching unit 12 to vehicle 10. It is to be understood that the coupling means must be disconnected from first and second overlay means 26 and 28 to allow movement of attachment unit 12 away from vehicle 10.

Attachment units 12 can optionally have support legs 34 which are foldable and extendable from attachment unit 12 to a supporting position such as is shown in FIGS. 2(a)–(c) and 3. Support legs 34 include collapsible braces 36 to insure their supporting rigidity.

As shown in FIG. 3, to remove camper unit 18, a pair of front cylinders 30 on both sides of vehicle 10 and a pair of rear cylinders 32 on both sides of vehicle 10, are operated to lift camper unit 18 so that first overlay means 26 is separated from second overlay means 28. This is accomplished after the coupling means are disconnected, which in the preferred embodiment comprise hydraulic piston arms which are insertable through aligned apertures in first overlay means 26, second overlay means 28 and original frame 24. Support legs 34 from camper unit 18 are folded downwardly and extended to contact the ground. The upper ends of cylinders 30 and 32 are then disconnected from camper unit 18, and truck 20 can be driven away. Truck 20 then can be used for another purpose, it can be attached to another attachment unit 12, or can be reattached to camper unit 18 by following the reverse of the above described steps.

Support legs 34 allow the attachment units 12 to be stored until further use in a position which is readibly and quickly attachable to vehicle 10. It is again emphasized that no auxiliary equipment is needed to allow this efficient interchangeability.

FIG. 1 shows a further feature of the present invention. By selectively uncoupling all coupling means except the one across the rear of frame 24, front hydraulic cylinders 30 could be solely operated to tilt an attachment unit 12, such as dump box 14, to provide a dumping action.

It is noted that front and rear cylinders 30 and 32 are angularly disposed towards one another when attachment unit 12 is sitting upon frame 24 so that when all cylinders 30 and 32 are operated attachment unit 12 will be lifted straight up and will not have any propensity to fall forward, backwards, or sideways (See FIG. 3). Such a configuration of cylinders 30 and 32 also allows front to rear dumping action, and also side tipping action, as will be discussed further herein.

Again, FIG. 4 depicts that the invention can be equally adaptable to both trucks 20 and trailers 22. It is also to be understood that generally, the bottom of attachment units 12 are flat, but many times the original frame 24 of vehicle 10 is not. For example, some trucks 20 (particularly pick-up trucks) have upward bends in frame 24 over the rear axle. It is to be understood that in these cases, first overlay means 26 can be constructed so as to have a flat upper surface to mate with the straight second overlay means 28, but can have shims, spacers, or other means to connect it rigidly, evenly, and securely to the original frame 24. Such is well within the skill of those of ordinary skill in the art.

Figures 5, 6:
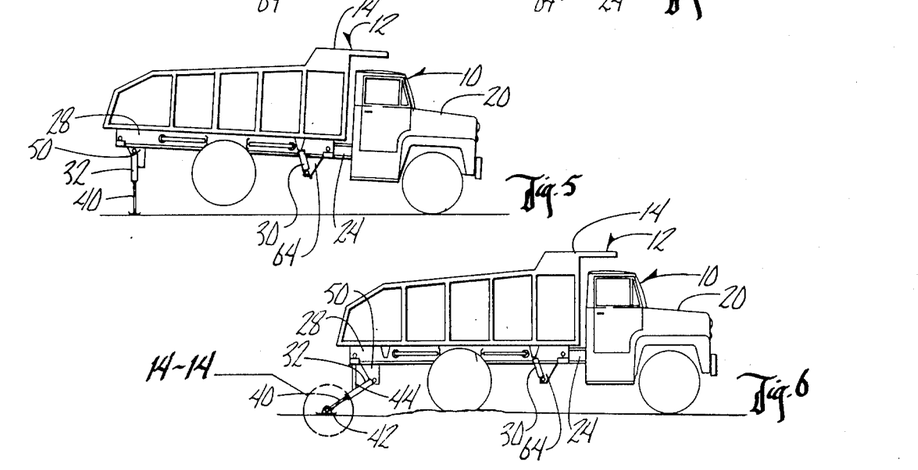
FIG. 5 is an elevational view of the truck of FIG. 1 depicting use of the rear hydraulic cylinders as jacks.
FIG. 6 is an elevational view of the truck of FIG. 1 depicting use of the rear hydraulic cylinders to assist in pushing the truck out of a stuck position.

FIG. 5 shows that any of the lifting cylinders 30 or 32 (in this case rear cylinder 32) can be disconnected from attachment unit 12, pivoted generally vertically downwardly, and operated to contact the ground and lift at least a portion of vehicle 10 upwardly. Usually, a shoe 38 would be secured to the end of piston arm 40 of cylinder 32 to provide a stable support on the ground. This feature allows cylinders carried on the vehicle frame to be used as jacks to change tires, allow inspection and work under the vehicle, or for other advantageous purposes.

Figure 14:
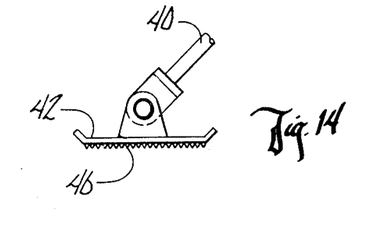
FIG. 14 is an isolated elevational view of the portion of FIG. 6 encircled by line 14—14.

FIG. 6 shows still another optional use for cylinders 30 and 32. By securing a gripping shoe 42 to the end of piston arm 40, and securing a brace 44 between cylinder 32 and vehicle 10, cylinder 32 can be positioned so as to extend angularly downward and backward from vehicle 10 so that gripping shoe 42 contacts the ground and serves to assist in propelling vehicle 10 forward, if, for example, it were stuck. This could also work in the reverse direction. FIG. 14 shows in more detail an embodiment for gripping shoe 42. Gripping shoe 42 is hingeably attached to the end portion of piston arm 40 and has a gripping surface 46 on its lower side. An example of such a gripping surface could be diamond plate steel.

Figure 7:
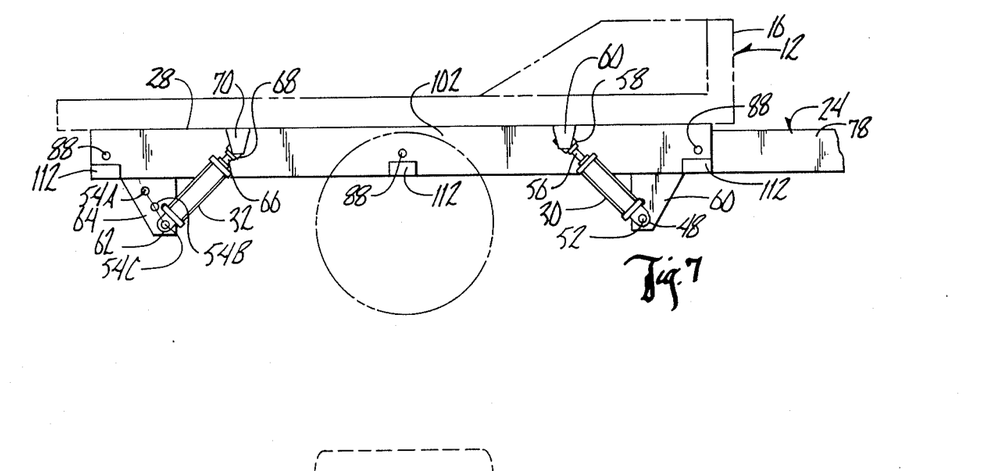
FIG. 7 is a partial elevational view of the present invention as applied to a truck or trailer frame.
Figure 8:
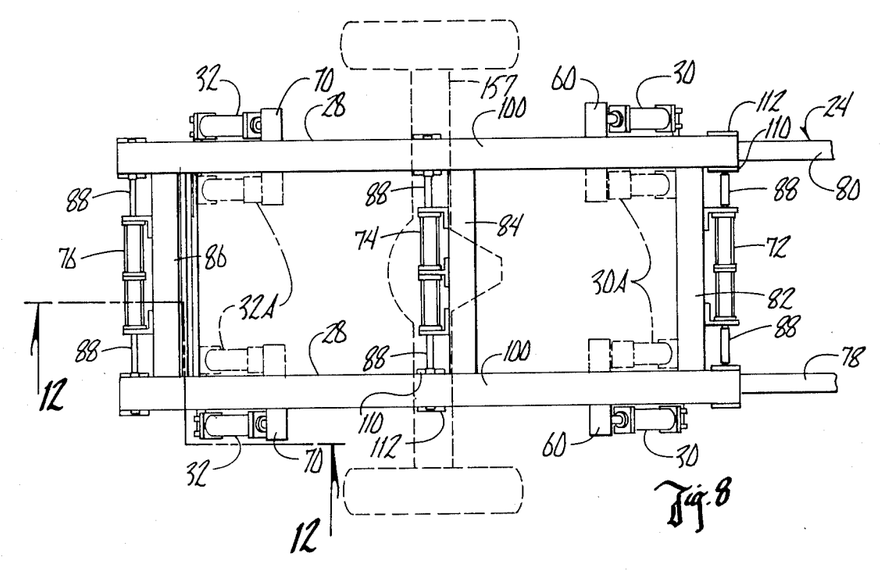
FIG. 8 is a partial plan view of the invention as applied to either truck or trailer framework and additionally showing alternative positioning of the lifting cylinders.

FIGS. 7 and 8 more specifically show the orientation of cylinders 30 and 32 with respect to each other and first and second overlay means 26 and 28. Each front hydraulic cylinder 30 has an end 48 which is pivotably attached to a flange 50 which is rigidly secured to either first overlay means 26 or original frame 24. The pivotal attachment is accomplished by a solid shaft 52 extending across and between each aperture 54 in each front flange 50. The other end of cylinder 30 is comprised of a piston arm 56 which at its distal end includes a quick release member 58. Quick release member 58 is removeably attachable to a corresponding connection member 60 rigidly secured to attachment unit 12. Rear hydraulic cylinders 32 have ends 62 the ends of solid shaft 52 which is positioned through opposite flanges 64, and have piston arms 66, quick release members 68, and connection members 70 the same as described with respect to front cylinders 30. As previously described, the only differences between front and rear cylinders 30 and 32 is that they extend angularly towards one another when attachment unit 12 is resting upon vehicle 10. It is also noted that optionally, there can be multiple solid shafts 52A, 52B, and 52C extended through and between rear flanges 64. This allows a height choice in positioning rear cylinders 32 according to whether they are used to lift, as a jack, or as a means to push the vehicle forward.

FIG. 8 shows that front and rear cylinders 30 and 32 can either be positioned outside of frame 24 or, as is shown by ghost lines 30A and 32A, can alternatively be positioned inside frame 24. Placement is according to choice or necessity. Some vehicles such as trucks have interferring structure on the interior of frame 24 requiring that cylinders 30 and 32 be placed on the outside.

The coupling means of the preferred embodiment are also shown in FIG. 8. Dual hydraulic cylinders 72, 74, and 76 are secured laterally across the interior of frame 24 at spaced-apart locations. As is conventional, original frame 24 is comprised of parallel spaced-apart left and right framerails 78 and 80, which are interconnected by crossbeams 82, 84 and 86. Dual hydraulic cylinders 72, 74, and 76 are connected, by appropriate structure, to crossbeams 82, 84, and 86. It is to be understood, however, that dual hydraulic cylinders 72, 74, and 76 can be attached to other parts or by other methods to frame 24. Each dual hydraulic cylinder 72, 74, and 76 has extendable piston arms 88 which extend oppositely from individual cylinder chambers and, when retracted as shown with regard to dual hydraulic cylinder 72, are totally removed from and within framerails 78 and 80, and first and second overlay means 26 and 28. Dual cylinders 72, 74, and 76 are simply individually operable single hydraulic cylinders secured end-to-end. However, when piston arms 88 are fully extended, as shown with regard to dual hydraulic cylinders 74 and 76, they extend through aligned apertures in first and second overlay means 26 and 28 on each framerail 78 and 80 of frame 24, to lock both second overlay means 28 with attachment unit 12, to vehicle 10.

Each half of dual hydraulic cylinder 72, 74, and 76, and all lifting cylinders 30 and 32, have appropriate and individually operable hydraulic connections to a hydraulic fluid source. It is to be understood that each hydraulic cylinder and arm can be operated independently and that all operation of the hydraulic cylinders can be accomplished by equipment and controls located on vehicle 10. Such connections, equipment, and controls are well known within the art, or are well within the skill of those with ordinary skill in the art.

Figures 9, 11:
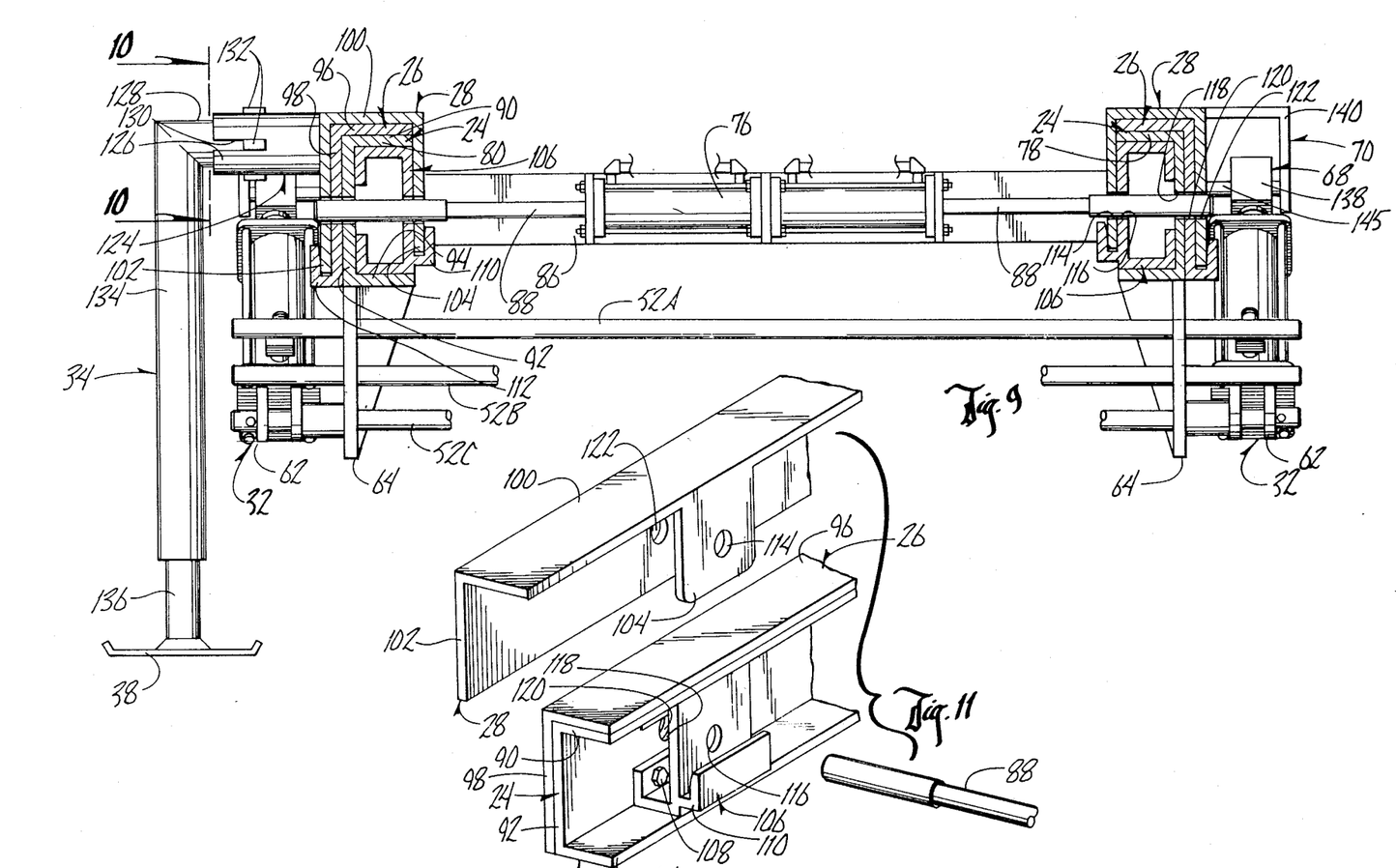
FIG. 9 is a partial sectional and end view of the invention showing the operation of the coupling means and of the support legs for the attachment unit.
FIG. 11 is a partial exploded perspective view of the overlay means and coupling means of the present invention.

FIGS. 9 and 11 show more clearly the nesting relationship of first and second overlay means 26 and 28, and framerails 78 and 80 of frame 24, and also the operation of the coupling means of dual hydraulic cylinders 72, 74, and 76. In the preferred embodiment, and as is conventional, parallel framerails 78 and 80 consist of opposed C-shaped-in-cross-section members each having a top horizontal wall 90, a vertical side wall 92, and a bottom horizontal wall 94. The vertical side walls 92 of each framerail 78 and 80 are positioned on the outside of the framerails.

First overlay means 26 basically have an inverted L-shape in cross-section, each having a top horizontal wall 96 matingly and abuttingly secured on the top horizontal wall 90 of its respective framerail 78 or 80, and a side vertical wall 98 abutting against vertical side wall 92 of the respective framerail 78 or 80 of framework 24.

Second overlay means 28 is also basically an inverted L-shape in cross-section, each having a top horizontal wall 100 matingly positionable over top vertical wall 96 of first overlay means 26, and a side vertical wall 102 matingly positionable against side vertical wall 98 of first overlay means 28. Additionally, second overlay means 28 has inner vertical wall portions 104 which are spaced along and extend downwardly from the inner edge of top horizontal wall 100 at spaced apart locations along the longitudinal length of second overlay means 28 corresponding with the position of dual hydraulic cylinders 72, 74, and 76. Thus, as shown in FIG. 9, at the location of vertical wall portions 104, second overlay means 28 is basically in the shape of an upsidedown "U" in cross-section. Inner vertical wall portions 104 serve to strengthen and assure rigidity along frame 24 where attachment units 12 are coupled. As can be most clearly seen in FIGS. 9 and 11, to further add support to framerails 78 and 80, an inner C-shaped-in-cross-section support member 106 can be mateably placed within the interior of each framerail 78 and 80 at the position of each inner vertical wall portion 104. Inner support members 106 can be welded or bolted by bolts 108 to framerails 78 and 80, and can include a channel 110 which receives the lower edge of inner vertical wall portions 104 of second overlay means 28 to disallow spread of inner vertical wall portions 104 where extendable piston arms 88 are being retracted back to dual hydraulic cylinders 72, 74, and 76. It is noted that first overlay means 26 can also have a channel 112 at the outside lower end of side vertical walls 98 to receive the side vertical walls 102 of second overlay means 28. This also prevents spread of side vertical walls 102 of second overlay means 28.

To allow extendable piston arms 88 to secure and couple attachment unit 12 to vehicle 10, there must be alignable apertures as follows: aperture 114 in inner vertical wall portion 104 of second overlay means 28; aperture 116 in the vertical innermost wall of inner support member 106; aperture 118 in vertical side wall 92 of framerails 78 and 80; aperture 120 in side vertical wall 98 of first overlay means 26; and aperture 122 of side vertical wall 102 of second overlay means 28.

Figure 10:
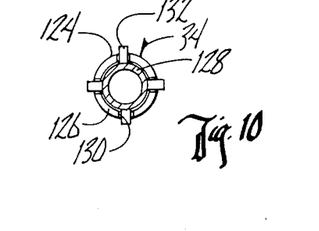
FIG. 10 is an isolated cross-sectional view taken along line 10—10 of FIG. 9.

FIG. 9 depicts one embodiment for foldable support legs 34. A tube 124 is secured at an inner end to second overlay means 28. Its outer end 126 is open and receives horizontal arm 128 of leg 34. Outer end 126 also has slots 130 which receive ears 132 which are connected to horizontal arm 128 of leg 34. Leg 34 can be folded upwardly and horizontally along attachment unit 12 or secured so that it is directed downwardly to the ground by positioning ears 132 in appropriate orientation in slots 130 according to which position is desired. It is to be appreciated many other types of folding mechanisms could be used with equal success. Vertical arms 134 of legs 34 are also adjustable by virtue of extension arm 136 which can be slideably secured in various positions within vertical arm 134. Extension arm 136 can be secured by a pin, cotter key, or other means (not shown) such as is known within the art. FIG. 10 show the orientation of ears 132 within slots 130 of tube 124.

FIGS. 9 and 11 also show solid bars 52A, B, and C and how they extend laterally between and across rear flanges 64. Their outer most ends are quickly attachable to ends 48 of rear cylinders 32. Such attachment is shown by threaded nuts to threaded ends of solid bars 52A, B, and C, but could be by quick release pins, cotter keys, or other means well within the skill of those in the art. Additional bars or other means could also be used to allow this variable height attachment. This can also be used on the other cylinders 30. In FIG. 11 it is noted that a pin or cotter key 145 could be used to lock a U-shaped flange in place during use.

Figures 12, 13, 15, 16:
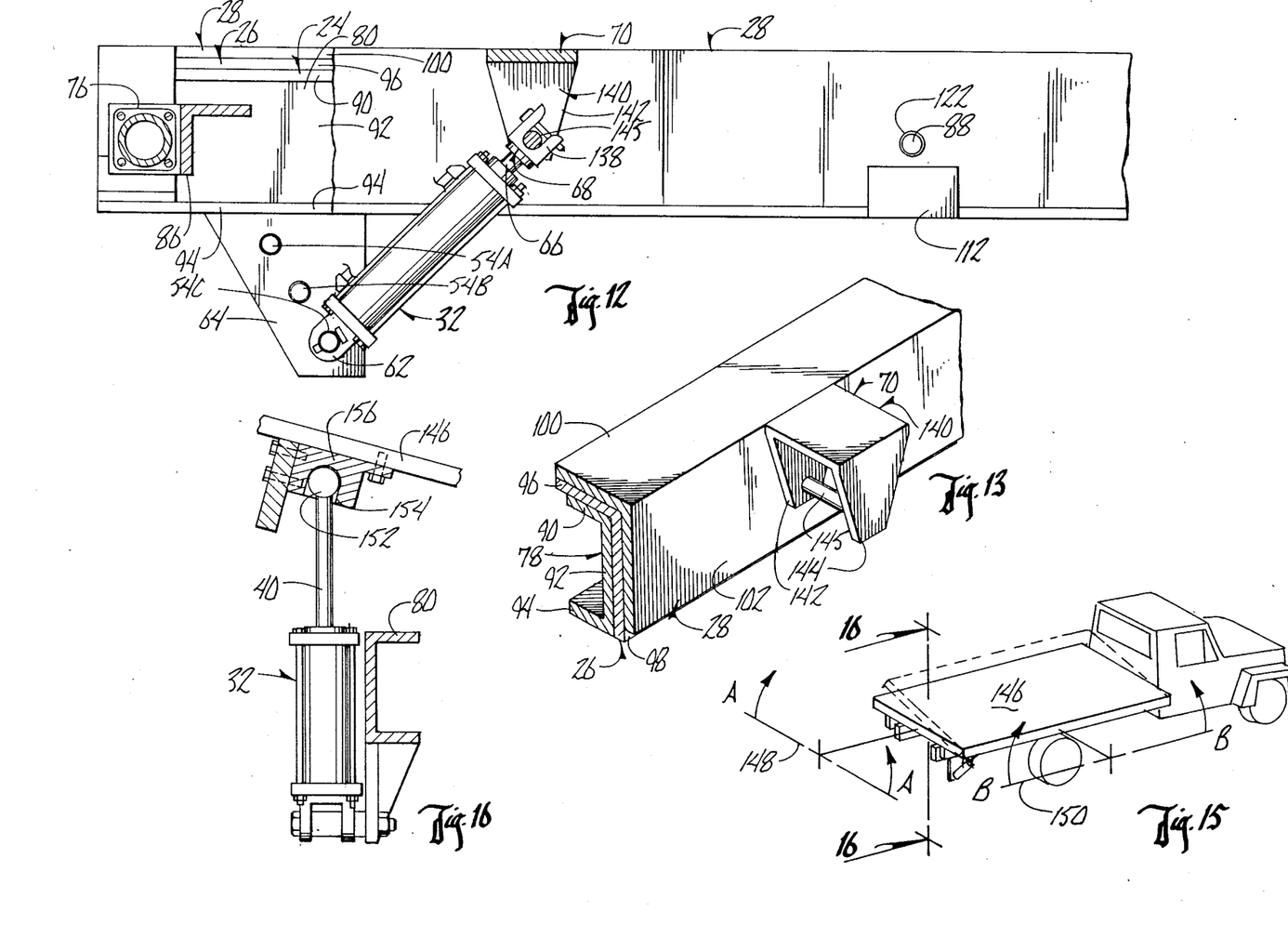
FIG. 12 is a partial elevational, cut-away and sectional view taken along line 12—12 of FIG. 8.
FIG. 13 is a partial perspective view showing one embodiment of attachment means for the lifting cylinders to the attachment unit.
FIG. 15 is a perspective view of an embodiment of the present invention depicting side tilting capability for the attachment unit.
FIG. 16 is a partial sectional elevational view of the embodiment of the invention shown in FIG. 15 taken along line 16—16 of FIG. 15.

FIGS. 12 and 13 depict one embodiment for quick release structure for front and rear lifting cylinders 30 and 32 in their connection to attachment unit 12. Quick release members 58 and 68 of piston arms 56 and 66 of cylinders 30 and 32 could simply consist of a U-shaped receiver 138 such as is shown in FIG. 12. The connection members 60 and 70 secured to attachment units 12 could consist of a U-shaped flange 140 having downward extending walls 142 and 144. A bar 145 can extend between walls 142 and 144 which can be captured by receiver 138. In this arrangement, the attachment unit 12 can be securely raised or lowered, while at the same time allowing quick release of cylinders 30 and 32 from the attachment unit 12. Other arrangements, well within those of ordinary skill in the art, can be equally suitable.

FIGS. 15 and 16 depict a still further feature of the present invention. By operating front and rear cylinders 30 and 32 on one side only of vehicle 10, the attachment unit 12, namely the flatbed 146 in FIG. 15, can be tipped or tilted sideways in either direction (which is schematically depicted by line A—A). Again, to accomplish the tipping action, the dual hydraulic cylinders securing attachment unit 12 to the vehicle must be retracted.

It is to be understood that flatbed 146 could also be tilted forward or backwardly by operation of appropriate cylinders 30 and 32, as is depicted by line B—B. In essence, flatbed 146 could be tipped or tilted in any direction.

FIG. 16 shows an embodiment of a connection between cylinders 30 and 32 and attachment unit 12 to allow tilting in any direction. A ball 152 is secured to the distal end of piston arms 40 of cylinders 30 and 32. Ball 152 is received within a generally spherical cavity 154 in attachment block 156 which is secured to attachment unit 12. Therefore, universal movement is allowed between piston arm 40 and attachment unit 12 to facilitate tipping of attachment unit 12 in any direction.

Figure 17:
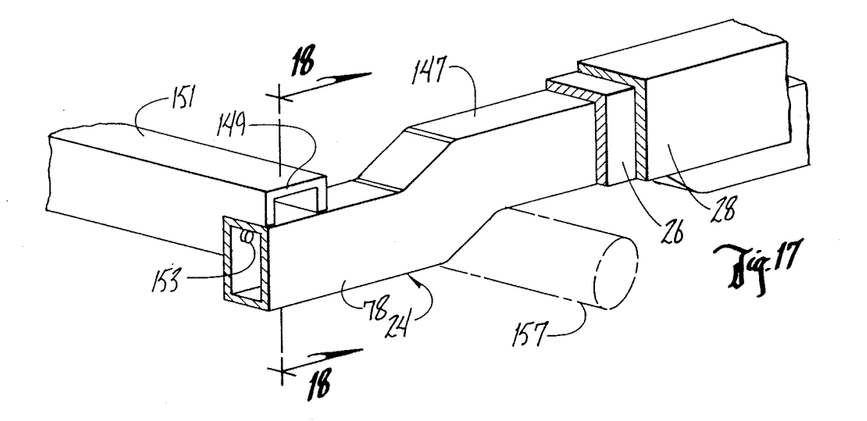
FIG. 17 is a partial cut-away perspective view of an alternative embodiment of the invention applied to an original vehicle frame which includes a bent portion.
Figure 18:
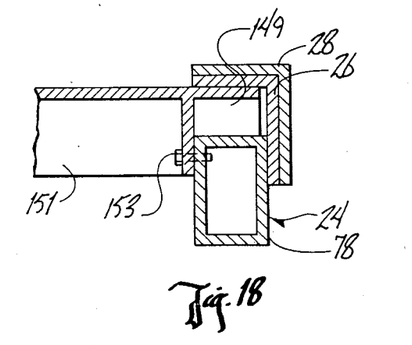
FIG. 18 is a sectional view taken along line 18—18 of FIG. 17.

FIGS. 17 and 18 show that when the vehicle frame 24 has any bent portion, (for example, to allow room for axle 157), such as upwardly bent portion 147, spacers 149 can be used to facilitate attachment of non-bent first overlay means 26. Spacers 149 ensure a stable, rigid fit for first overlay means 26. The invention, including second overlay means 28, functions the same as previously described. It is noted that additional cross-members 151 may be utilized to ensure sufficient rigidity and strength when spacers 149 are used. In FIGS. 17 and 18, cross-members 151 are integrated directly into spacers 149 and it is to be understood that cross-members 151 extend transversely across the frame between framerails 78 and 80. The spacer/cross-member combination can be secured to framerails 78 and 80 by bolts 153, or by other means known within the art.

It will be appreciated that the present invention can take many forms and embodiments. The true essence and spirit of this invention are defined in the appended claims, and it is not intended that the embodiment of the invention presented herein should limit the scope thereof.

For example, mechanisms other than hydraulic cylinders could be used for the lifting means and the coupling means. Also, the number and placement of the lifting means and coupling means is variable according to design.

I claim:

1. A retrofittable vehicle framework means for interchangeable use with a variety of attachment units comprising:

a pair of first overlay means rigidly retrofittably overlapped and rigidly secured to the existing conventional framework of a vehicle, said conventional framework comprising two parallel laterally spaced-apart frame rails, each having top and side sections, and cross-members secured laterally between the frame rails, each said first overlay means having a top horizontal portion over the top section of a corresponding framerail and presenting a generally flat, horizontal support surface along the length of each first overlay means, and a side vertical portion mateably extending downwardly relative to the horizontal portion and positioned in abutment along the side section of a corresponding framerail so that the first overlay means generally covers the outer facing surfaces of the top and side sections of the framerails and to provide strengthening support to the top and sides of framerails;

a pair of second overlay means rigidly secured to an attachment unit and corresponding to each first overlay means and framerail, being mateably removably positionable over in a generally covering relationship to said first overlay means and at least a portion of the corresponding framerail, said second overlay means having a top horizontal portion and a vertical portion exending downwardly from one side of the top horizontal portion along the length of said second overlay means, said top and vertical portions being removably mateably positionable in abutment to the top and side portions of the first overlay means; and coupling means mounted on the framework of a the vehicle for releaseably securing said attachment unit to said vehicle framework when said attachment unit is positioned on said vehicle framework said coupling means including means to interlock each second overlay means to the corresponding first means and framerail by releasable securement of the vertical portion of the second overlay means in vertical abutment to the side vertical portion of the first overlay means and side section of the framerail.

2. The means of claim 1 wherein the vehicle framework includes two parallel longitudinally spaced-apart framerails.

3. The device of claim 2 wherein said framerails are C-shaped in cross section having top and bottom horizontal walls and a vertical side wall on the outward side of the vehicle framework.

4. The means of claim 1 further comprising spacer means positioned between the vehicle framework and the first overlay means if any space exists therebetween.

5. The retrofittable vehicle framework means of claim 1 wherein said second overlay means includes vertical sections extending downwardly from the other side of the top horizontal portion at spaced apart locations along said second overlay means corresponding with the position of said coupling means along the vehicle framework.

6. The means of claim 1 wherein said coupling means are located at spaced-apart locations along said vehicle framework.

7. The means of claim 1 wherein said coupling means include retractable coupler arms which movably extend to said framerails of said vehicle framework, and said first and second overlay means.

8. The means of claim 7 wherein said coupler arm extends into aligned apertures in said framework and said first and second overlay means.

9. The means of claim 8 wherein said coupling means comprises a hydraulic cylinder, the piston arm of said hydraulic cylinder comprising the coupler arm.

10. The means of claim 9 wherein said coupling means comprises a double hydraulic cylinder having piston arms extending in opposite directions.

11. The means of claim 1 wherein said vehicle comprises a motorized, self-locomoting means.

12. The means of claim 1 wherein said vehicle comprises a non-motorized, non-self-locomoting trailer.

13. The means of claim 1 further comprising means on said vehicle framework releaseably attachable between said vehicle framework and said attachment unit for raising said attachment unit from said vehicle framework when said coupling means are released.

14. The means of claim 13 wherein at least one lifting means is operable to tilt the attachment unit with respect to the vehicle framework and when appropriate coupling means are released, to provide a dumping or tipping movement to the attachment unit.

15. The means of claim 1 wherein said attachment units further include foldable leg support means to independently support the attachment unit separately from the vehicle framework.

16. A method for providing interchangeable attachment units for a vehicle framework, comprising the steps of:

fitting in an overlayed relationship a pair of first overlay means in a rigidly secured relationship to the exisiting framework of a vehicle, said framework comprising two parallel laterally spaced-apart framerails each having top and side sections, and cross members secured laterally between the framerails, each said first overlay means having a top horizontal portion and a side vertical portion generally mateably positioned over the top and side sections of the corresponding framerail so that the first overlay means generally covers at least a portion of outer facing surfaces of the top and side sections of the framerails and provides strengthening support to the tops and sides of the framerails;

securing a pair of second overlay means to the attachment unit in a mateable and corresponding position to respective first overlay means framerails, said second overlay means having a top horizontal portion and a vertical portion extending from one side of the top horizontal portion along the length of said second overlay means, said top and said vertical portions being removably mateably positionable in a generally covering relationship to the top and side portions of the first overlay means and at least a portion of the corresponding framerail;

coupling the second overlay means to the first overlay means and vehicle framework to secure the attachment means to the vehicle framework for interlocking each second overlay means to the corresponding first overlay means and framerail by releasable securement of the vertical portion of the second overlay means in vertical abutment to the side vertical potion of the first overlay means and side section of the framerail; and uncoupling second overlay means from first overlay means and vehicle framework to release the attachment unit for removal from the vehicle framework and for substitution of an attachment unit thereon.

17. The method of claim 16 wherein the coupling of the second overlay means to the first overlay means and vehicle framework is accomplished by removably inserting at least one coupling pin through each of the first and second overlay means and framework when the second overlay means is matingly positioned over the first overlay means and framework.

18. The method of claim 16 wherein the coupling of the second overlay means to the first overlay means and vehicle framework is accomplished by simultaneously coupling both framerails.

19. The method of claim 18 wherein simultaneous coupling of framerails is accomplished by utilizing a double hydraulic cylinder having piston arms extending in opposite directions.

20. The framework means of claim 1 further comprising attachment and strengthening supports secured at spaced apart locations along each framerail at locations corresponding with the position of each said coupling means along the vehicle framework, and on an opposite side of the framerail from the first overlay means, to provide strengthening support for the framework and for the coupling means.

21. The framework means of claim 1 wherein the top horizontal portions of the first overlay means, and the top horizontal portions of the second overlay means are generally the same vertical thickness as the top section of the framerails so that the height between the attachment unit and the framerails is not significantly increased from the carrying position of a conventional attachment directly to the framerails.

22. The framework means of claim 1 wherein the coupling means comprises a plurality of retractable pin means, each of said side sections of the framerails, side vertical portions of the first overlay means, and vertical portions of the second overlay means, having aligned apertures for each coupling means when the second overlay means is positioned upon the first overlay means and framerails so that the coupling means can secure the second overlay means to the first overlay means and framerails through the side sections, side vertical portions, and the vertical portions.

23. The framework means of claim 20 further comprising vertical sections extending downwardly from the other side of the top horizontal portion of the second overlay means at spaced apart locations long said second overlay means corresponding with the position of said coupling means along the vehicle framework, and corresponding with the position of the attachment and strengthening inserts along the vehicle framework.

24. A retrofittable vehicle framework means for interchangable use with a variety of attachment units, said framework means being retrofittable to a conventional vehicle framework comprising two parallelly spaced apart framerails each having top and outer side sections, and having cross-members secured laterally between framerails, comprising:

first overlay means rigidly secured along at least a portion of each framerail, said first overlay means having a top horizontal portion and a side vertical portion exending downwardly along and being secured in abutment to the side section of the framerail, said first overlay means generally covering the top and side portions of the framerail to provide a generally flat upper surface for support of an attachment unit and for strengthening of the framerails without adding substantial increased heights to the framerails and the frame;

second overlay means rigidly secured to the underside of an attachment unit, said second overlay means including a top horizontal portion and an outer vertical portion extending from an outer side edge of the top horizontal portion, said top and said vertical portions mateably fitting over and an abutting and generally covering relationship along at least a portion of the top and vertical side portions of the first overlay means;

coupling means mounted on the framework of the vehicle for releasably securing said attachment unit to said vehicle framework, said coupling means including extendable and retractable means which can be selectively moved horizontally through alignable apertures in the side section of the framerails, the side vertical portions of the first overlay means, and the vertical portions of the second overlay means to interlock the second overlay means to the first overlay means and framerails, without adding substantial increased height to the attachment unit.

* * * * *